(12) United States Patent
Hatchell et al.

(10) Patent No.: US 9,217,804 B2
(45) Date of Patent: Dec. 22, 2015

(54) SEISMIC CLOCK TIMING CORRECTION USING OCEAN ACOUSTIC WAVES

(75) Inventors: Paul James Hatchell, Katy, TX (US); Kurang Jvalant Mehta, Houston, TX (US)

(73) Assignee: Shell Oil Company, Houston, TX (US)

( * ) Notice: Subject to any disclaimer, the term of this patent is extended or adjusted under 35 U.S.C. 154(b) by 539 days.

(21) Appl. No.: 13/636,765

(22) PCT Filed: Mar. 24, 2011

(86) PCT No.: PCT/US2011/029747
§ 371 (c)(1),
(2), (4) Date: Sep. 24, 2012

(87) PCT Pub. No.: WO2011/119802
PCT Pub. Date: Sep. 29, 2011

(65) Prior Publication Data
US 2013/0013212 A1    Jan. 10, 2013

Related U.S. Application Data

(60) Provisional application No. 61/318,090, filed on Mar. 26, 2010.

(51) Int. Cl.
*G01V 1/38* (2006.01)
(52) U.S. Cl.
CPC ........................ *G01V 1/38* (2013.01)
(58) Field of Classification Search
CPC .................................................. G01V 1/3808
USPC .......................................................... 702/14
See application file for complete search history.

(56) References Cited

U.S. PATENT DOCUMENTS

| | | | | |
|---|---|---|---|---|
| 4,912,682 A * | 3/1990 | Norton, Jr. | ........... | G01V 1/3835 367/19 |
| 6,049,507 A * | 4/2000 | Allen | ..................... | G01V 1/364 367/21 |
| 6,590,831 B1 * | 7/2003 | Bennett et al. | ................... | 367/16 |
| 6,775,084 B1 | 8/2004 | Ozdemir et al. | ................ | 360/55 |
| 6,791,901 B1 * | 9/2004 | Robertsson | ........... | G01V 1/003 181/110 |
| 7,193,932 B2 | 3/2007 | Chamberlain | .................. | 367/76 |
| 7,194,010 B2 | 3/2007 | Beasley et al. | ................ | 370/503 |
| 7,561,493 B2 * | 7/2009 | Ray et al. | ....................... | 367/188 |
| 7,660,203 B2 | 2/2010 | Barakat et al. | .................. | 367/76 |
| 2002/0063588 A1 * | 5/2002 | Page et al. | ..................... | 327/141 |
| 2005/0047275 A1 * | 3/2005 | Chamberlain et al. | ......... | 367/56 |
| 2005/0052951 A1 * | 3/2005 | Ray et al. | ...................... | 367/188 |
| 2006/0291328 A1 * | 12/2006 | Robertsson | .............. | G01V 1/36 367/24 |
| 2007/0070808 A1 * | 3/2007 | Ray et al. | ........................ | 367/15 |

(Continued)

*Primary Examiner* — John Breene
*Assistant Examiner* — Raymond Nimox

(57) ABSTRACT

A method for identifying clock timing discrepancies in at least one clock of interest that is associated with a marine seismic receiver, comprises collecting from at least one marine receiver other than the receiver of interest a first data set corresponding to a selected time period, said first data set being selected to include ocean wave signals; collecting from the receiver of interest a second data set corresponding to the selected time period, said second data set being selected to include ocean wave signals; applying a mathematical prediction technique to the ocean wave signals in the first data set so as to generate a predicted response for a receiver co-located with the receiver of interest; comparing the predicted response to the second data set so as to generate a correlation data set; and using the correlation data set to determine a corrected parameter for the receiver of interest.

13 Claims, 2 Drawing Sheets

(56) References Cited

U.S. PATENT DOCUMENTS

| | | | |
|---|---|---|---|
| 2007/0189117 A1* | 8/2007 | Robertsson | G01V 1/36 367/24 |
| 2007/0214202 A1* | 9/2007 | Beylkin | G01V 1/28 708/290 |
| 2007/0265785 A1* | 11/2007 | Robertsson | G01V 1/364 702/14 |
| 2008/0008037 A1* | 1/2008 | Welker | G01V 1/38 367/21 |
| 2008/0049550 A1* | 2/2008 | Fleure | G01V 1/24 367/14 |
| 2008/0080650 A1* | 4/2008 | Adachi | 375/355 |
| 2008/0219094 A1* | 9/2008 | Barakat | G01V 1/247 367/21 |
| 2008/0320324 A1* | 12/2008 | Ke et al. | 713/401 |
| 2009/0006053 A1 | 1/2009 | Carazzone et al. | 703/5 |
| 2009/0067546 A1* | 3/2009 | Willen | G01V 3/12 375/316 |
| 2009/0129202 A1* | 5/2009 | Bisley | G01V 1/36 367/24 |
| 2011/0019502 A1* | 1/2011 | Eick | G01V 1/20 367/50 |

* cited by examiner

SEISMIC CLOCK TIMING CORRECTION USING OCEAN ACOUSTIC WAVES

RELATED CASES

The present application claims priority from PCT/US2011/029747, filed 24 Mar. 2011, which claims priority from U.S. provisional application 61/318,090, filed 26 Mar. 2010, which are both incorporated herein by reference.

FIELD OF THE INVENTION

The invention relates to clocks used in ocean bottom sensors for recording seismic signals and more particularly to methods for correcting for clock timing errors.

BACKGROUND OF THE INVENTION

In deepwater ocean bottom surveys, autonomous seismic detectors are placed on the seabed and make continuous or intermittent seismic recordings. These detectors may be referred to as ocean bottom seismometers (OBS). During the recording periods, a plurality of seismic signals ("shots") may be transmitted into the ocean and/or into the seafloor for the purpose of seismically illuminating the subsurface formations, as illustrated schematically in FIG. 1. Seismic signals that have been refracted, reflected and/or transmitted through the subsurface are recorded by the seismic detectors. After recording seismic signals for a period of time, the nodes are recovered and the seismic data they have recorded are processed for the purpose of extracting information about the subsurface. In order to extract meaningful information, it is advantageous to determine the location and relative timing of each seismic node.

The very precise clocks that are required for accurate seismic data analyses tend to drift unpredictably over time. Some clocks may lose time while others may gain it, and the rate of drift for a given clock may vary over time. Over the two-month time period of a typical seismic survey, clocks may easily drift as much as 50 ms in either direction. Finally, operator errors in the initial clock synchronization or final data collection may add to the timing-derived errors.

For these reasons, there remains a need for improving the degree of precision that is possible in ocean bottom seismic surveys.

SUMMARY OF THE INVENTION

The present invention provides methods and systems for improving the degree of precision that is possible in ocean bottom seismic surveys.

In some embodiments, a method for identifying clock timing discrepancies in at least one clock of interest that is associated with a seismic receiver comprises the steps of: a) collecting from at least one receiver other than the receiver of interest a first data set corresponding to a selected time period, said first data set being selected to include ocean wave signals; b) collecting from the receiver of interest a second data set corresponding to the selected time period, said second data set being selected to include ocean wave signals; c) applying a mathematical prediction technique to the ocean wave signals in the first data set so as to generate a predicted response for a receiver co-located with the receiver of interest; d) comparing the predicted response to the second data set so as to generate a correlation data set; and e) using the correlation data set to determine a corrected parameter for the receiver of interest.

Step c) may comprise applying a mathematical prediction technique selected from the group consisting of averaging, interpolation, weighted interpolation, extrapolation and weighted extrapolation. Step a) may comprises collecting data from at least two receivers. The ocean waves signals include signals below 2 Hz or below 1 Hz.

The receiver of interest and the other receivers may or may not lie on a line. The other receivers may be on the same or opposite sides of the receiver of interest. Step c) may include applying weights to the ocean wave signals in the first data set, wherein each signal's weight correspond to the position of that signal's receiver relative to the receiver of interest. The weights may be selected using "natural neighbor" interpolation or "natural neighbor" extrapolation.

As used in this specification and claims the following terms shall have the following meanings.

"Ocean acoustic waves" refers to acoustic energy propagating through water column and detectable at seafloor. This energy can be generated by wind, gravity, surface activity, tides, currents, and/or thermal flow, among others.

"Omnidirectional" is intended to encompass ambient waves that are substantially omnidirectional, as distinguished from waves from a point source or from a single direction.

In the description that follows, the words "receiver," "node," and "detector" may be used interchangeably and it will be understood that, for purposes of describing the invention, they are intended have the same meaning.

A "synthetic node" refers to a hypothetical node for which signal data are predicted.

BRIEF DESCRIPTION OF THE DRAWINGS

For a more detailed understanding of the invention, reference is made to the accompanying Figures, in which.

DETAILED DESCRIPTION OF A PREFERRED EMBODIMENT

Figure 1:
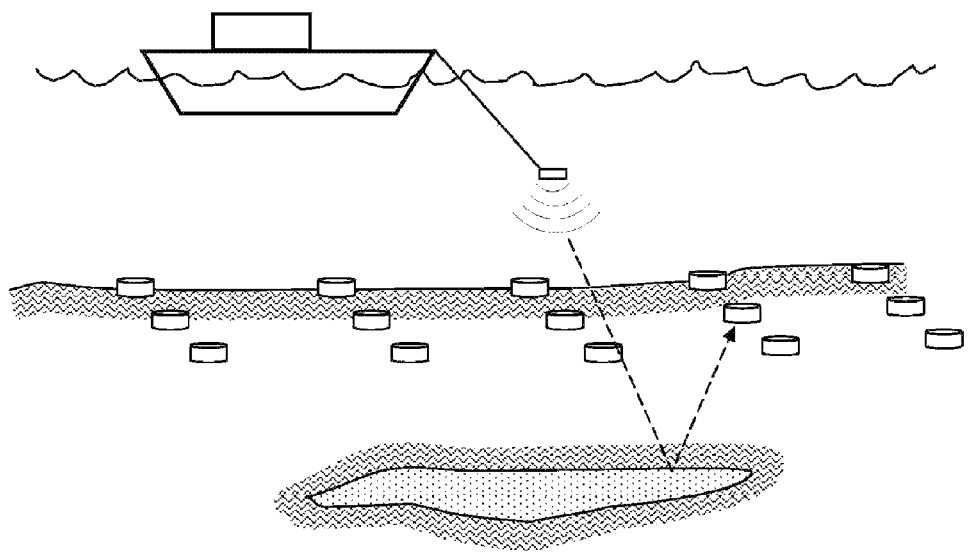
FIG. 1 is a schematic diagram of a marine seismic surveying system in which the present invention could be used and FIG. 2 is a schematic diagram of three sensors illustrating one embodiment of the invention.

In preferred embodiments, the present invention is carried out in a marine environment such as is illustrated in FIG. 1. A towed seismic source emits a signal that passes through the seafloor, is reflected off of a subsurface formation, and is received at one of a plurality of receivers that are deployed on the seafloor. Although one preferred embodiment includes receivers that are spaced apart in a regular array, it is not necessary to the success of the invention that the receivers be equally spaced, in rows, or in an array. Still further, and as discussed below, it is not necessary that the present invention be carried out offshore.

The sensors/receivers useful in the present invention may be an array of OBS nodes or a row of OBS nodes spaced apart along an ocean-bottom cable. During the survey period, the present invention is not dependent on communication between an individual receiver and either its neighbors or a central device. In preferred embodiments, the invention allows for correction of clock times in multiple receivers that have not been connected to any synchronizing device for a period of time sufficient to allow drift to occur.

It has been discovered that certain omnidirectional waves that exist in the ocean can be used advantageously to compute mathematically-derived clock comparisons, which can in turn be used to identify and correct clock timing errors. In particular, it has been discovered that ocean waves detected by seismic detectors include some waves having sufficiently low frequency that the wavelength is much longer than the spacing between receivers, and that interpolation or extrapolation of the low-frequency data between two or more receivers gives an accurate measurement of clock drift.

The ocean acoustic wave energy is continuously present and can be recorded by all seismic sensors placed on the seafloor. The existence of guided acoustic modes in the ocean was described by Ewing, Jardetzky, and Press, "Elastic Waves In Layered Media," McGraw-Hill Publication, 1957. These waves have a lowest order mode that propagates with a lowest, or "cutoff," frequency $F=vc/(4H\sqrt{c^2-v^2})$, where H is the water depth, v is the water velocity and c is the sediment velocity.

Thus, for many fields, the ocean waves will have a wavelength that is substantially larger than the typical spacing between nodes used in ocean bottom surveying, which may be on the order of hundreds of meters. For example, in a hypothetical field, v may equal 1500 m/s, c may equal 1800 m/s, and H may equal 1000 m, so that F=0.678 Hz. The horizontal wavelength of a wave in this field would be c/F=2653 m. For oil and gas exploration and production surveys, the typical spacing between adjacent ocean bottom nodes ranges from 10 to 1000 and more typically from 100 to 500 meters.

Acoustic waves in the ocean may be written as a summation of terms of the form $F(x)=\exp(i(kx-wt))$, where k represents the wave number and w the angular frequency. For a node located at F(x+dx) this expression becomes $$F(x+dx)=\exp(ik(x+dx)-iwt)=\exp(ikx-iwt+i\epsilon)$$

where $\epsilon=kdx$

For a wave propagating with phase velocity c, k=w/c and $\epsilon=wdx/c$. The theory of calculus shows that $$\exp(ix+i\epsilon) = \exp(ix)\left(1+i\epsilon - \frac{\epsilon^2}{\epsilon}\ldots\right)$$

and that when $\epsilon$ is sufficiently small, it is a good approximation to ignore all terms higher order than $i\epsilon$.

$\epsilon<<1$ occurs when $dx2\pi F/c<<1$, and so when $dx<<c/2\pi F$. This will occur for low frequencies and/or high phase velocities. For the exemplary acoustic guided ocean wave described above where c=1800 m/s and F=0.678 Hz this condition becomes: dx<<422 m. As 422 m is at the upper end of the range of typical OBS nodes, this aligns with the discovery that usable data can be extracted from low-frequency ocean waves.

Thus length of the wavelength relative to the typical sensor spacing allows accurate interpolatation the wave-field between sensors and this provides a convenient tool for measuring timing drift. Suppose there are three sensors in a line located at positions x−dx, x, and x+dx, where dx is the sensor spacing. Assuming waves of the type exp(ikx) (where the overall time dependence of exp(iωt) is ignored), the response at the outer two sensors is exp [ik(x±dx)]. We can interpolate these to predict a synthetic co-located response at the central sensor location. Averaging the outer wave-fields we obtain exp(ikx)*cos(kdx) and this predicted response has the same phase has the true wave-field modified by a real factor. Provided that the spatial sampling is not aliased so that $kdx<\pi$ or equivalently that $dx<\lambda/2$, we can compare the synthetic co-located response with the true response to detect timing difference.

Thus, in environments where the wavelength of the ocean wave is larger or, more preferably, significantly larger, than the node spacing, signals recorded at the frequency of the ocean waves can be used to determine information about the nodes themselves and/or to accurately predict the signal at positions between adjacent nodes. According to preferred embodiments of the invention, an interpolation or extrapolation scheme is applied to the wavefields recorded at a plurality of sensors and the resulting data are used to estimate the wavefield recorded at a new location. If the new location is selected to correspond to the actual location of a third sensor, the estimated wavefield can compared with the wavefield recorded by the third sensor. In particular, the arrival times of events in the estimated wavefield can be used to determine clock timing differences between the sensors. The accuracy of the estimate will depend on various factors, including but not limited to: proximity of the third sensor to the other sensors, amplitude of the wave signal, and accuracy of the position information. Nonetheless, it has been shown that useful data can be obtained in systems that are representative of typical ocean bottom seismic systems.

Figure 2:
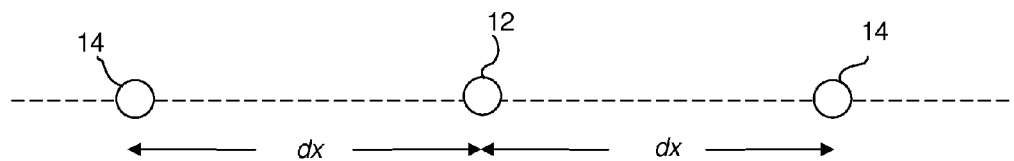

It will be understood that algorithms for interpolation and for extrapolation are well known in the art. By way of a example only, sensors could be selected in groups of three, where the three sensors lie on a straight line and the outer two sensors are equally spaced from the inner sensor, as illustrated in FIG. 2. In this simple arrangement, signals from the outer receivers 14 can be averaged to predict a signal for a synthetic node at the position of inner receiver 12 because the first order terms cancel each other out, i.e. as set out above, $[(1+i\epsilon)+(1-i\epsilon)]/2=1$. It will be understood that similar mathematical techniques can be used to predict a signal for a synthetic co-located node based a variety of input signal positions. For example, the sensors do not need to be co-linear, the synthetic node does not have to be between the other two nodes, more than two other nodes may be used, and the number of other nodes does not have to be even.

It has also been discovered that, for sufficiently low frequencies, it may be possible to use a single data point to predict a value for a nearby data point. This will be most true for separation distances less than 1/10, and more preferably less than 1/20, of a wavelength, i.e. for $\epsilon<<1$.

The predicted signal for the synthetic node can be compared to the actual signal measured by the actual node with which the synthetic node is co-located or nearly co-located. It has been discovered that when the node spacing is sufficiently low relative to the signal wavelength, the predicted value is sufficiently close to the real measured value that it can be used to detect timing differences. The comparison can be performed using any suitable technique, including but not limited to feature identification or cross-correlation.

Figure 3:
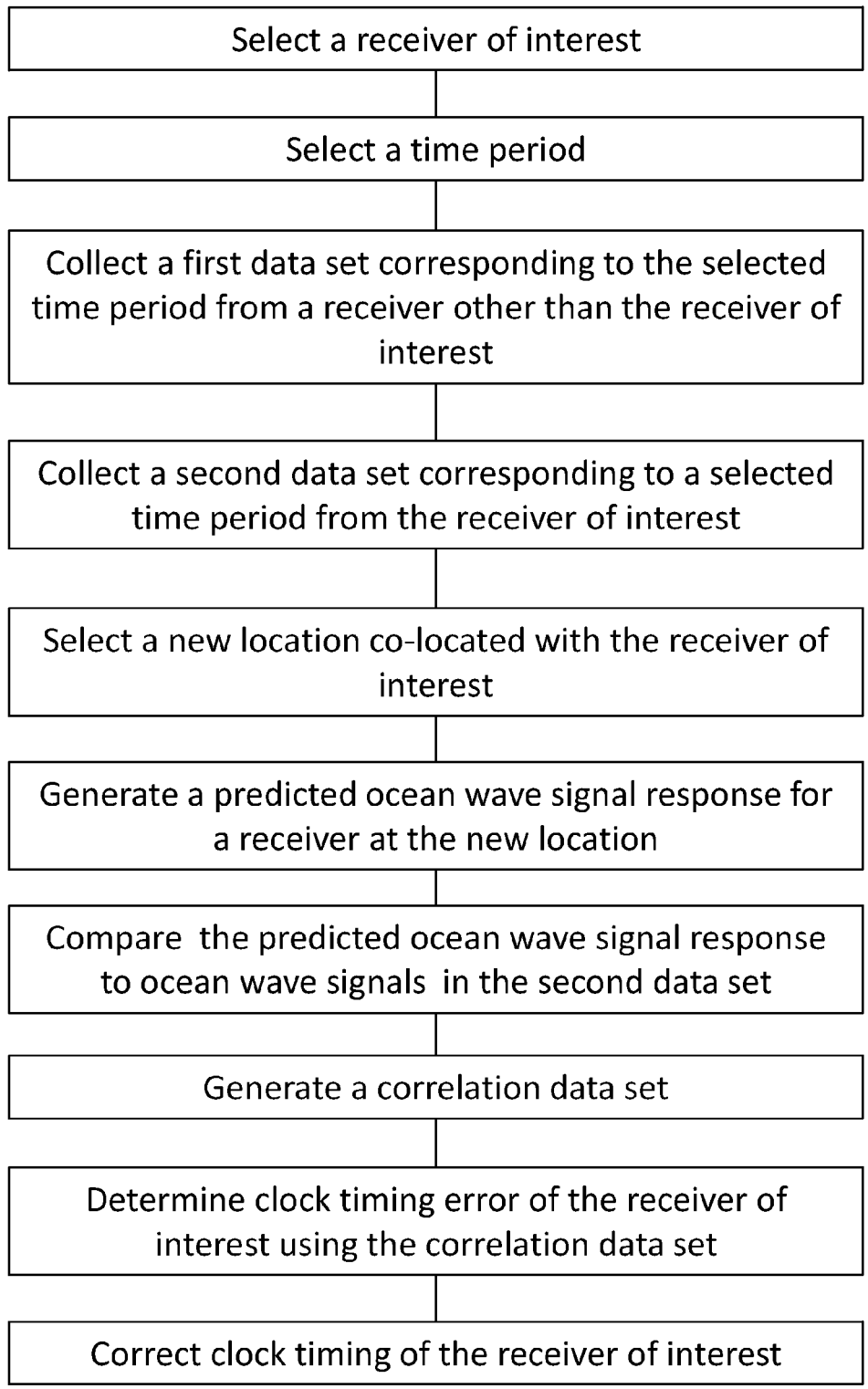
FIG. 3 schematically illustrates a method for identifying clock timing discrepancies according to an embodiment of the invention.

An embodiment of the method is schematically illustrated in FIG. 3.

Thus, the present prediction and comparison technique can be used to identify and correct receivers whose clocks have drifted, as the predicted and measured signals will then have a non-zero time shift.

According to another exemplary embodiment, to estimate a wavefield at a given location x, the wavefields at two or more other locations are summed, preferably using weights that correspond to their position relative to location x. Once such method entails selecting the weight terms B(i) such that $G(x)=\Sigma_{i=1}^{N}(B(i)F_i(x+dx(i)))$, $\Sigma(B(i))=1$, and $\Sigma(dx(i)B(i))=0$, where N is the number of nodes used in the interpolation (not including the node selected for comparison), where G(x) is the predicted signal for the synthetic co-located node at location x, $F_i(x+dx(i))$ is the signal from the other nodes located at $x+dx(i)$. The weight terms B(i) can be selected using suitable numerical methods that include either interpolation or extrapolation. In one preferred embodiment, B(i) are selected using "natural neighbor" interpolation (Ledoux and Gold, Interpolation as a tool for the modeling of three-dimensional geoscientific datasets; Watson, D. F., Compound Signed Decomposition, The Core of Natural Neighbor Interpolation in n-Dimensional Space). In another embodiment, B(i) are calculated using "natural neighbor" extrapolation (Bobach, et al., Natural neighbor extrapolation using ghost points, Computer Aided Design 41 (2009) 350-365). Extrapolation is useful when the synthetic node is located at edges of the grid or has multiple missing nodes in its vicinity.

The present techniques give particularly good correlations when the signal data do not include active shots, shot energy is weak, and/or ambient wave energy is high.

For large numbers of nodes, which may all have timing drift, it will be understood that the same concepts can be applied, using a least squares estimation to simultaneously determine all of the drift values. Any other suitable mathematical technique could be used. The techniques give best results when a reference node is used to compute the drift of other nodes, or when the average drift is assumed to be zero.

One advantage of the present invention is that it can be used to identify inaccurate clocks even when the clock identifying information has become lost or corrupted. Likewise, the present invention can be used to confirm that each clock/receiver pair is correctly identified, to identify which clock belongs with each receiver line when the clock/receiver information has become lost or corrupted, and/or to correct position information when receiver position information has become lost or corrupted. Correcting clock and/or position information may include looking for outliers in the correlation between the estimated and actual values.

Other advantages include: significant reduction in computation time compared to other clock-drift correction methods such as seismic interferometry and/or using active source data; and production of a continuous record of the timing drifts by repeating the analysis over many time intervals.

Another advantage of the invention is that it can be used during times when sea conditions prevent the acquisition of conventional data. Noisy passive data may be recorded, for example, during periods of shot inactivity during storms. During these times, active shooting is typically curtailed in the field because the noise degrades the quality of active seismic measurements. In contrast, the relatively high level of wave energy results in a strong ocean wave signal, which is advantageous in the present techniques.

Still another advantage of the invention is that it enables measurement of clock drift rate over time without requiring any additional equipment or calibration. Data from different time intervals can be used to determine clock drift rate and whether it is constant over time. The resulting information can be used to correct concurrently-collected seismic data, thereby allowing more accurate information about the subsurface to be provided.

While the present invention has been described and disclosed with respect to preferred embodiments of the invention, it will be understood that variations and modifications can be made without departing from the scope of the invention, which is set out in the claims that follow. For example, while a preferred embodiment has been described herein with respect to ocean acoustic waves, it will be understood that the concepts disclosed are applicable in any environment in which omnidirectional or "daylight" acoustic noise exists or can be simulated. Thus, the present techniques can be used in onshore applications as well as marine; with adequate coupling, microseisms and other ambient or artificial noise can function in the same manner as the ocean acoustic waves described herein.

Unless expressly stated, the sequential recitation of steps in the claims is not intended to include a requirement that the steps are performed in a particular order.

What is claimed is:

1. A method for identifying clock timing discrepancies in at least one clock of interest that is associated with a seismic receiver, comprising the steps of:
    a) collecting from at least one receiver other than the receiver of interest a first data set corresponding to a selected time period, said first data set being selected to include ocean wave signals recorded at a frequency of ocean waves caused by omnidirectional propagating acoustic noise, wherein there is a receiver spacing between the at least one receiver other than the receiver of interest and the receiver of interest;
    b) collecting from the receiver of interest a second data set corresponding to the selected time period, said second data set being selected to include ocean wave signals recorded at the frequency of ocean waves caused by the same omnidirectional propagating acoustic noise;
    c) with a computer generating a predicted ocean wave signal response for a receiver at a new location from the ocean wave signals recorded at a frequency of ocean waves in the first data set, whereby the new location is selected to be co-located with the receiver of interest;
    d) with the computer comparing the predicted ocean wave signal response to ocean wave signals recorded at a frequency of ocean waves in the second data set so as to generate a correlation data set; and
    e) with the computer using the correlation data set to determine clock timing error of the receiver of interest; and
    f) with the computer correcting the clock timing of the receiver of interest by accounting for the clock timing error;
    wherein the receiver spacing is smaller than a wavelength of the omnidirectional propagating acoustic noise that causes the ocean wave signals.

2. The method according to claim 1 wherein step c) comprises applying a mathematical prediction technique selected from the group consisting of averaging; interpolation; weighted interpolation; extrapolation and weighted extrapolation.

3. The method according to claim 1 wherein step a) comprises collecting data from at least two receivers.

4. The method according to claim 1 wherein ocean waves signals include signals below 2 Hz.

5. The method according to claim 1 wherein the receiver of interest and the other receivers lie on a line.

6. The method according to claim 5 wherein the other receivers are on opposite sides of the receiver of interest.

7. The method according to claim 5 wherein the other receivers are on the same side of the receiver of interest.

8. The method according to claim 1 wherein the receiver of interest and the other receivers do not lie on a line.

9. The method according to claim 1 wherein step c) includes applying weights to the ocean wave signals in the first data set, wherein each signal's weight correspond to the position of that signal's receiver relative to the receiver of interest.

10. The method according to claim 9 wherein the weights are selected using "natural neighbor" interpolation.

11. The method according to claim 9 wherein the weights are selected using "natural neighbor" extrapolation.

12. The method according to claim 1, wherein the spacing is less than $\frac{1}{10}$ of the wavelength.

13. The method according to claim 1, wherein the at least one receiver and the receiver of interest are deployed on a seafloor in a water column, and wherein the omnidirectional propagating acoustic noise are omnidirectional ocean acoustic waves propagating through the water column.

* * * * *